(12) United States Patent
Hunt

(10) Patent No.: US 7,341,444 B2
(45) Date of Patent: Mar. 11, 2008

(54) GARMENT HANGER AND MOLDING APPARATUS

(75) Inventor: William Joseph Hunt, Stoke Poges (GB)

(73) Assignee: Braitrim (UK) Limited, London (GB)

( * ) Notice: Subject to any disclaimer, the term of this patent is extended or adjusted under 35 U.S.C. 154(b) by 0 days.

(21) Appl. No.: 11/415,666

(22) Filed: May 2, 2006

(65) Prior Publication Data

US 2006/0278672 A1 Dec. 14, 2006

Related U.S. Application Data

(63) Continuation of application No. PCT/GB2004/004604, filed on Nov. 2, 2004.

(30) Foreign Application Priority Data

Nov. 4, 2003 (GB) .................................. 0325719.3

(51) Int. Cl.
*A41D 27/22* (2006.01)
(52) U.S. Cl. ....................................................... 425/542
(58) Field of Classification Search ................ 425/542, 425/577
See application file for complete search history.

(56) References Cited

U.S. PATENT DOCUMENTS

| | | | | |
|---|---|---|---|---|
| 2,716,513 A | * | 8/1955 | Braunstein | 223/94 |
| 2,722,351 A | * | 11/1955 | Dyer | 223/89 |
| 3,406,881 A | | 10/1968 | Batts | |
| 3,581,959 A | | 6/1971 | Niehenke et al. | |
| D275,539 S | * | 9/1984 | Mainetti | D6/319 |
| 5,364,258 A | * | 11/1994 | Buckley et al. | 425/501 |
| 5,702,649 A | * | 12/1997 | Taylor | 264/1.9 |
| 6,004,123 A | * | 12/1999 | Buckley et al. | 425/174.4 |
| 6,875,392 B2 | * | 4/2005 | Olk et al. | 264/318 |
| 2004/0222254 A1 | * | 11/2004 | Olk et al. | 223/85 |
| 2004/0256425 A1 | * | 12/2004 | Barre et al. | 223/85 |

FOREIGN PATENT DOCUMENTS

| | | | |
|---|---|---|---|
| DE | 3423301 | | 1/1986 |
| DE | 19501200 A1 | * | 10/1995 |
| DE | 19810516 | | 9/1999 |
| EP | 210334 A2 | * | 2/1987 |
| EP | 0728432 | | 8/1996 |
| GB | 837179 | | 6/1960 |
| GB | 1335470 | | 10/1971 |
| JP | 60021211 A | * | 2/1985 |

* cited by examiner

*Primary Examiner*—Yogendra N. Gupta
*Assistant Examiner*—Dimple Bodawala
(74) *Attorney, Agent, or Firm*—Seyfarth Shaw LLP

(57) ABSTRACT

An injection molding apparatus 80 has a cavity 64 and core 65 co-operatively defining a void of inverted J-shape transverse cross-section for molding a garment hanger 10. A first leg 115, 127 of the J-shape cross-section forms a front of the garment hanger, a base 111 of the J-shape cross-section forms a transversely arcuate upper face of the garment hanger for receiving shoulders of a garment to be suspended from the garment hanger and a second leg 116, 126, opposed to the first leg, and substantially shorter than the first leg, forms a return rear portion of the garment hanger. A garment hanger molded in the injection molding apparatus is also disclosed.

10 Claims, 8 Drawing Sheets

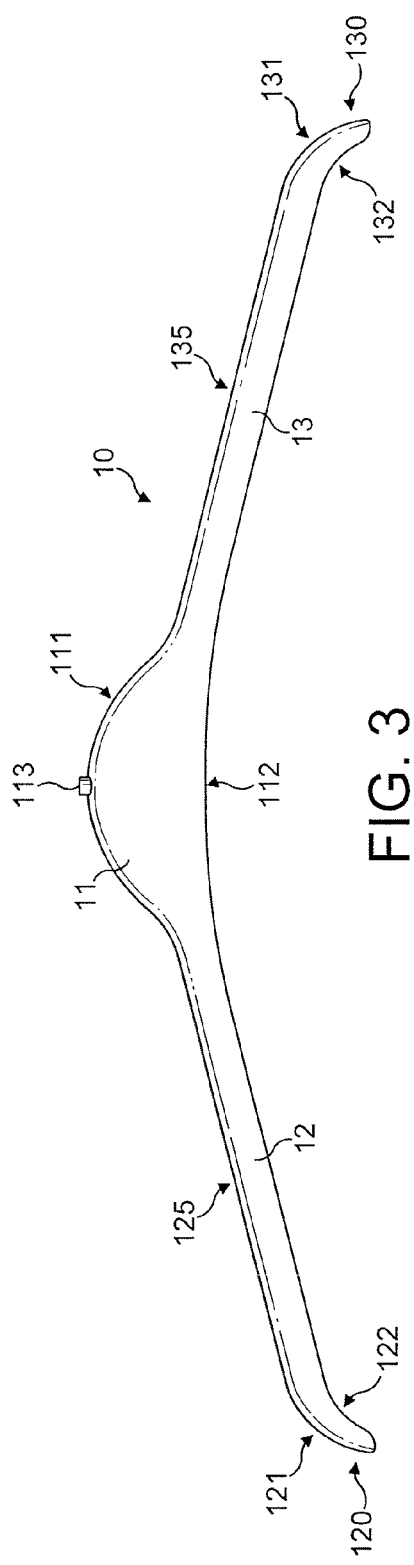
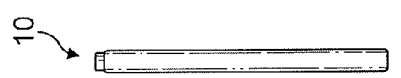
FIG. 3
FIG. 4

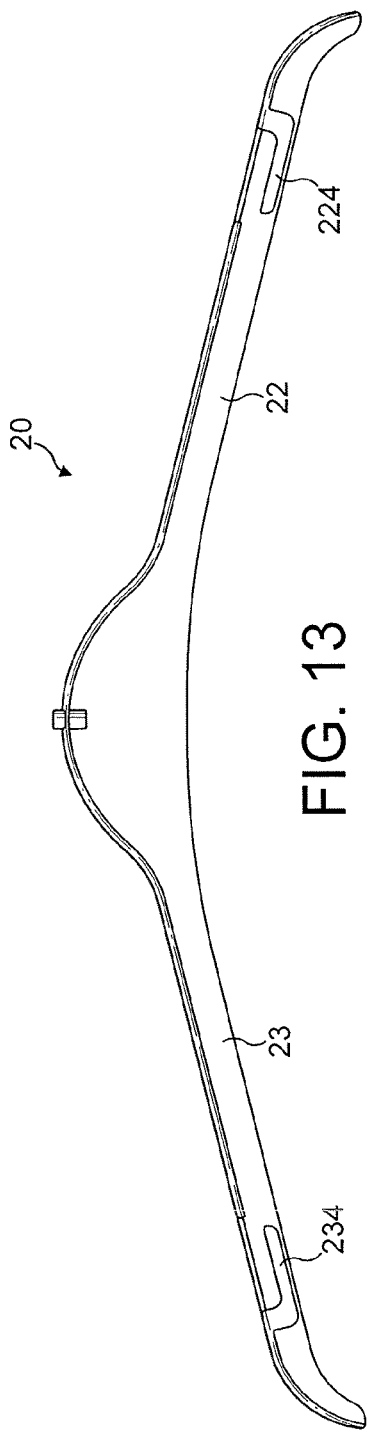
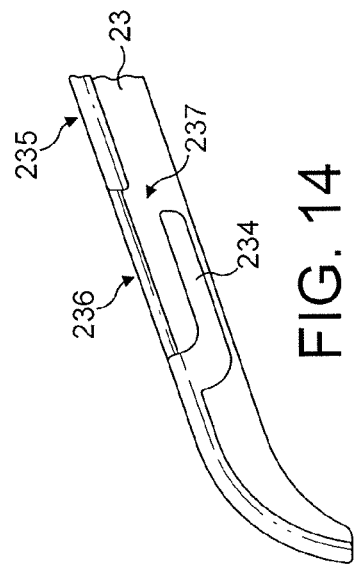
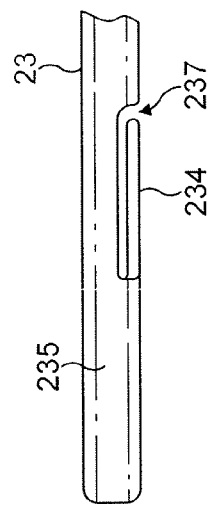
FIG. 13
FIG. 14
FIG. 12

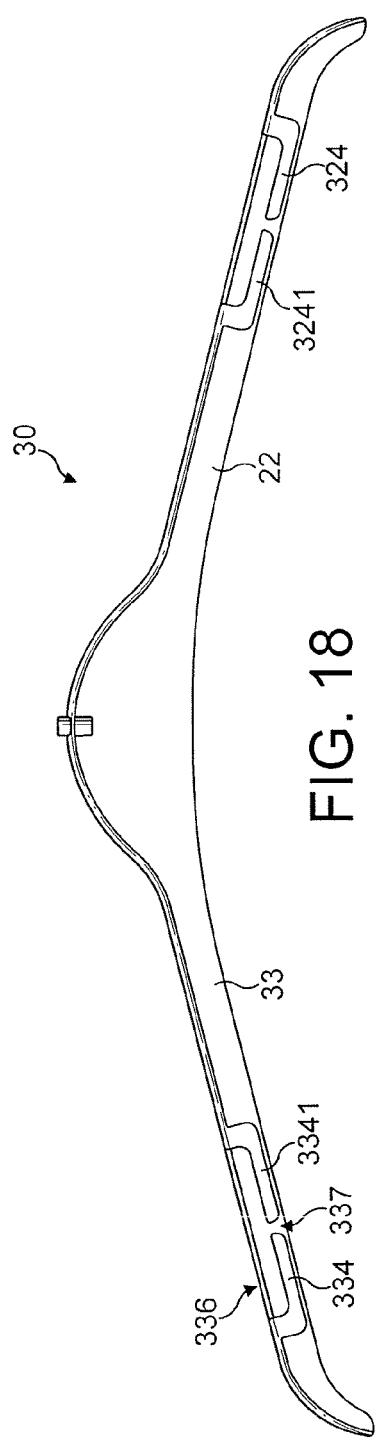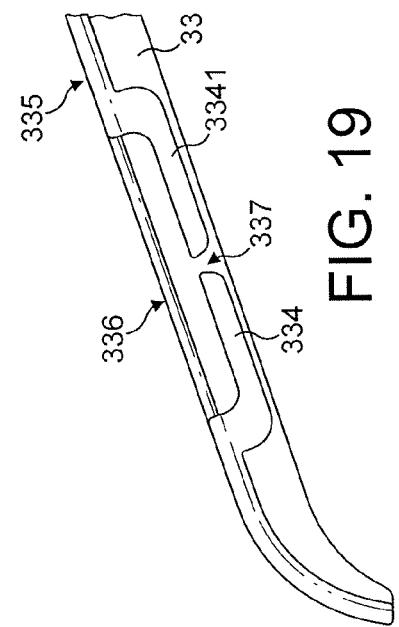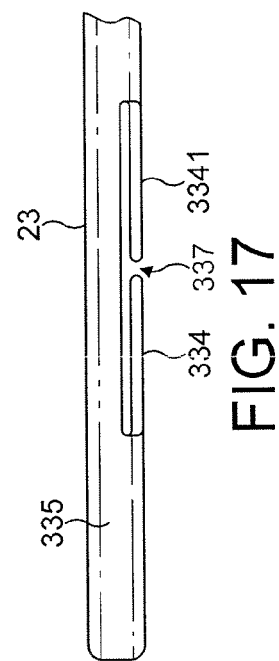

GARMENT HANGER AND MOLDING APPARATUS

CROSS-REFERENCE TO RELATED APPLICATIONS

This application is a continuation in part of International Patent Application PCT/GB2004/004604 filed Nov. 2, 2004, claiming priority from GB 0325719.3 filed Nov. 4, 2003.

FIELD OF THE INVENTION

This invention relates to an injection molded garment hanger and a molding apparatus for molding such a garment hanger.

BACKGROUND OF THE INVENTION

Injection molded garment hangers of various transverse cross-sections are known.

A known I-section garment hanger has a I-shaped transverse cross-section with upper and lower substantially planar flanges transverse to an interconnecting web. Front and rear views of the garment hanger are therefore the same or similar, so that the upper and lower flanges are, in an undesirable manner for some applications, visible both from the front and rear of the garment hanger. The garment hanger is molded with a mold split line along upper and lower faces of the upper and lower flanges respectively and substantially in the plane of the web, that is the garment hanger is molded with the garment hanger horizontal in the mold 90, as shown in FIG. 9, with garment hangers 91 located adjacent one another with an upper face of one garment hanger adjacent a lower face of a neighboring garment hanger. In order for the garment hanger to be removable from the mold the upper surface of the upper flange is therefore necessarily substantially planar and does not present a desirable rounded upper surface for receiving shoulders of a garment to be suspended from the garment hanger.

A known C-section garment hanger has a C-shaped transverse cross-section with an upper flange or portion and a lower flange or portion on only a rear side of an interconnecting web. The flanges or upper and lower portions are therefore, in a desirable manner, not visible from a front of the garment hanger. The garment hanger is molded with a mold split line along the upper flange or portion and typically, although not necessarily, also along the lower flange or portion and substantially parallel to a plane defined by the web, that is with the garment hanger horizontal in the mold 90, as shown in FIG. 9, with garment hangers 91 located adjacent one another with an upper face of one garment hanger adjacent a lower face of a neighboring garment hanger. Moreover, sufficient space has to be allowed between neighboring garment hangers for a side action for formation of a boss in a body portion of the garment hanger for receiving a suspension hook. In order for the garment hanger to be removable from the mold the upper surface of the upper flange or portion is therefore necessarily substantially planar or of only limited curvature and does not present a desirable rounded upper surface for receiving shoulders of a garment to be suspended from the garment hanger.

A known U-section garment hanger has an inverted U-shaped transverse cross-section with no flanges. The garment hanger is molded with a mold split line along a lower edge of the garment hanger and the split line defines a surface substantially perpendicular to planes defined by a front portion and a substantially parallel rear portion of the garment hanger, which form opposed legs of the U-shaped cross-section, that is with the garment hanger vertical in a mold as shown in FIG. 8, with the garment hangers located one in front of another with a front face of one garment hanger adjacent a rear face of a neighboring garment hanger. During molding a portion of a molding core is located between the opposed front and rear faces of the garment hanger. Therefore, a narrowness with which a U-section garment hanger can be molded, that is a distance between the front and rear portions or legs, is limited by a limited narrowness of a core having sufficient strength not to bend or crack under pressures exerted during molding. Moreover, due to their narrowness, the cores are too small and weak to locate cooling channels close to a surface of the core and therefore close to an opposed cavity, for rapid cooling of mold material. The upper surface can, however, be desirably rounded for receiving shoulders of a garment to be suspended from the garment hanger.

SUMMARY OF THE INVENTION

According to the invention, there is provided an injection molded garment hanger having an inverted J-shape transverse cross-section such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line is located on a front face of the first leg and on a rear face of he second leg.

Conveniently, the molding split line is located at a base of the front face of the first leg.

Advantageously, the molding split line is located at a base of the rear face of the second leg.

Conveniently, the garment hanger further comprises hook means dependent from the arcuate upper face from which a garment provided with straps or loops may be suspended by the straps or loops.

Advantageously, the garment hanger comprises opposed arms, wherein the opposed arms are each provided with a respective opposed hook means.

Advantageously, the garment hanger comprises opposed arms, wherein the opposed arms are each respectively provided with a pair of opposed hook means, According to a second aspect of the invention, there is provided an injection molding apparatus for molding a garment hanger, the apparatus having a cavity and core co-operatively defining a void of inverted J-shape transverse cross-section for molding a garment hanger, defining a major plane of the garment hanger, such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line defines at least one surface substantially perpendicular to the major plane of the garment hanger.

Advantageously, the molding split line is located on the front face of the first leg and on a rear face of the second leg.

Conveniently, the molding split line is located at a base of the front face of the first leg.

Advantageously, the molding split line is located at a base of the rear face of the second leg.

Advantageously, a major portion of the core is of a sufficient thickness for cooling channels to be located in the major portion of the core proximate the cavity.

Conveniently, the major portion of the core is wider than a distance between the first leg and the second leg.

Advantageously, cooling channels are located in the core proximate the cavity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which:

FIG. 3 is a front view of the garment hanger of FIG. 1;

FIG. 4 is a side view of the garment hanger of FIG. 1;

FIG. 12 is an enlarged top view of a portion of the garment hanger of FIG. 10;

FIG. 13 is a rear view of the garment hanger of FIG. 10;

FIG. 14 is an enlarged rear view of the portion of the garment hanger of FIG. 12;

FIG. 17 is an enlarged top view of a portion of the garment hanger of FIG. 15;

FIG. 18 is a rear view of the garment hanger of FIG. 15; and

FIG. 19 is an enlarged rear view of the portion of the garment hanger of FIG. 17.

DETAILED DESCRIPTION OF PREFERRED EMBODIMENTS

Figure 1:
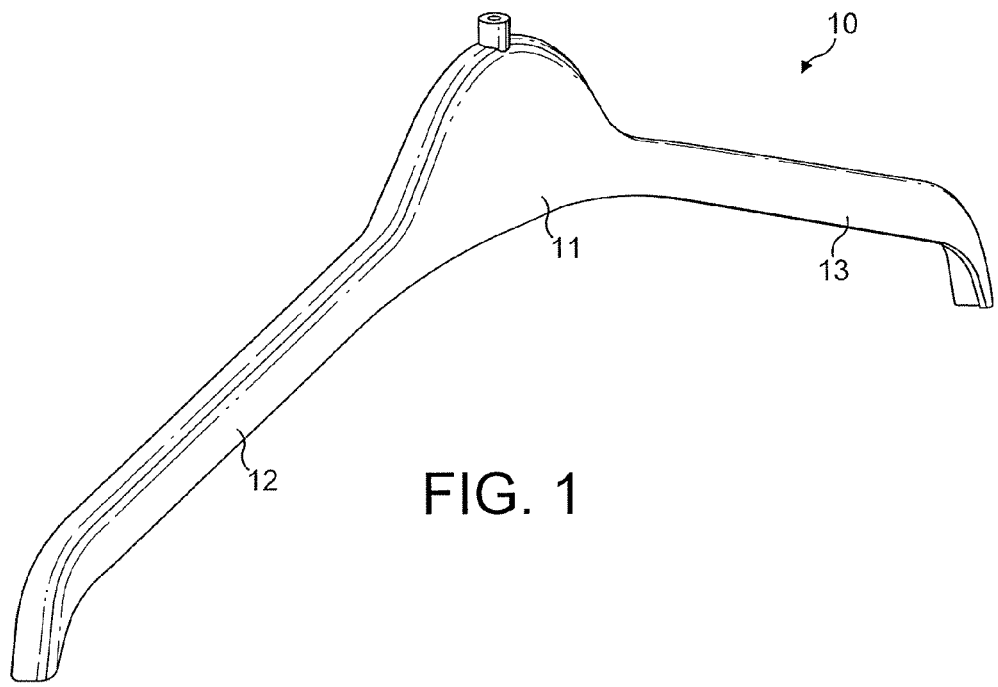
FIG. 1 is a front perspective view of a first embodiment of a garment hanger according to the invention.
Figure 2:
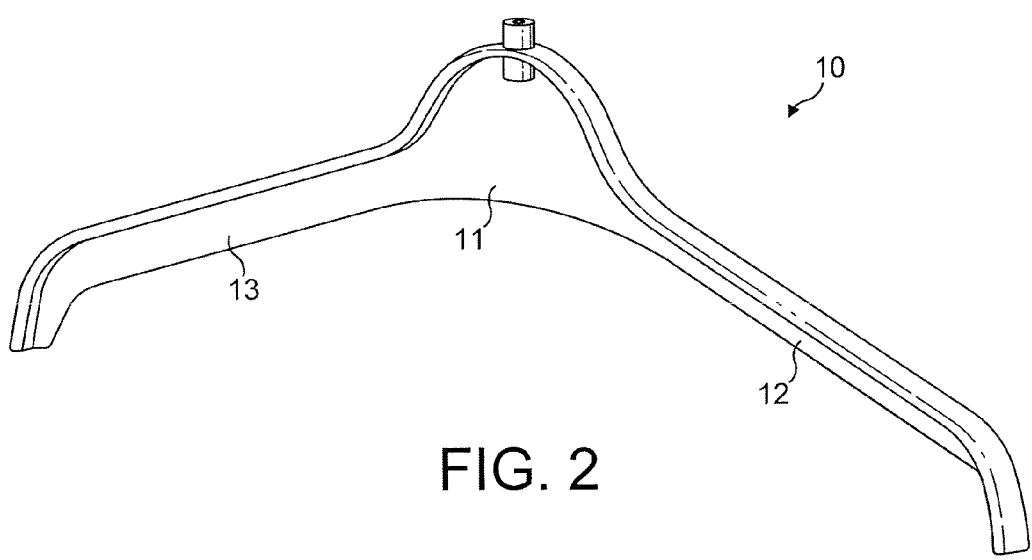
FIG. 2 is a rear perspective view of the garment hanger of FIG. 1.
Figure 5:
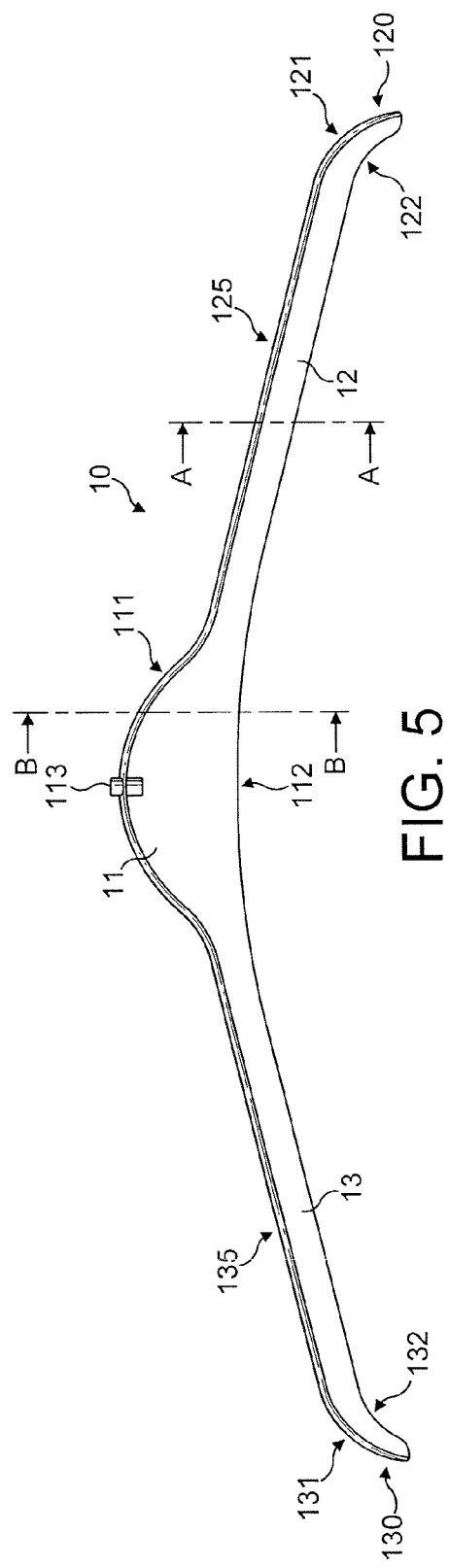
FIG. 5 is a rear view of the garment hanger of FIG. 1.

Throughout the description, like reference numerals are used to identify like parts.

Figure 7:
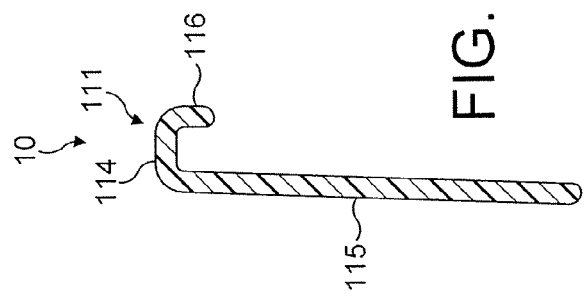
FIG. 7 is an enlarged transverse cross-section along the line B-B of FIG. 5.
Figure 6:
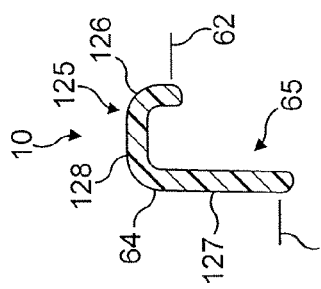
FIG. 6 is an enlarged transverse cross-section along the line A-A of FIG. 5.

Referring to FIGS. 1 to 7, a garment hanger 10 according to an embodiment of the invention has a generally inverted J-shaped transverse cross-section as best shown in FIGS. 6 and 7. The garment hanger has a central body portion 11 having an upwardly convex upper face 111 and an upwardly concave lower face 112 having a greater radius of curvature than the upper face. The body portion has, central of the upper face 111, a boss 113 passing through the upper face to receive a known garment hanger hook, not shown, for suspending the garment hanger 10. Joined to opposed sides of the central body portion 11 are opposed first and second arms 12, 13 inclined, in use, below a horizontal line through the body portion. The first and second arms 12, 13 terminate remote from the body portion in down-turned portions 120, 130 respectively, each having an upwardly convex upper face 121, 131 respectively with a smaller radius of curvature than a radius of curvature of an upwardly concave lower face 122, 132 respectively. As best seen in FIGS. 6 and 7, an upper face of the arms 125, 135 is wider in a direction transverse of the arms 12, 13 than the upper face 11 of the body portion 11.

As best shown in FIG. 7, a first leg 115 of the inverted J-shape cross-section central body portion forms a front of the central body portion of the garment hanger, a base 114 of the inverted J-shape cross-section central body portion forms a transversely arcuate upper face 111 of the body portion of the garment hanger and a second leg 116, opposed to the first leg 115, and substantially shorter than the first leg 115, forms a return rear portion of the body portion of the garment hanger 10. As best shown in FIG. 6, a first leg 127 of the inverted J-shape cross-section first arm forms a front of the first arm 12 of the garment hanger, a base 128 of the inverted J-shape cross-section first arm forms a transversely arcuate upper face 125 of the first arm of the garment hanger for receiving shoulders of a garment to be suspended from the garment hanger 10 and a second leg 126, opposed to the first leg 127, and substantially shorter than the first leg 127, forms a return rear portion of the first arm of the garment hanger 10. The second arm 13 is a mirror image of the first arm 12. As shown in FIGS. 6 and 7, the length of the second leg 116, 126 is substantially a same length in the body portion and the first and second arms, whereas the first leg 115 is substantially eight times longer than the second leg 116 along the line B-B in the body portion and the first leg 125 is substantially three times longer than the second leg 126 along a major portion of the first and second arms.

Referring to FIGS. 10 to 14 a garment hanger 20 forming a further embodiment of the invention is similar to the first described embodiment 10. As best seen in FIGS. 12 and 14, the garment hanger 20 has an arm 23 having a longitudinal axis and an upper face 235. Dependent from the upper face 235 of the arm 23, proximate an outer, free end thereof, there is provided an L-shaped hook 234. A base of the L-shaped hook 234 is substantially parallel to the longitudinal axis and extends inward of the garment hanger arm. An elongate portion of the upper face 235 of the arm 23 substantially above, in use, the base of the hook 234 is cut away to form an elongate cutaway 236. The elongate cutaway 236 extends inward of the garment hanger arm 23 further than the base of the L-shaped hook to define a gap 237 between an inner extremity of the base of the L-shaped hook 234 and an inner extremity of the elongate cutaway 236. Thus, in use, the inner extremity of the L-shaped hook is spaced both horizontally and vertically from the inner extremity of the elongate cutaway 236.

The garment hanger is provided with a further arm 22 opposed to the arm 23 having a further L-shaped hook 224 so that the further arm 22 and the further L-shaped hook 224 are a mirror image of the arm 23 and the L-shaped hook 234.

In use, a garment having, for example, first and second straps or loops may be suspended from the garment hanger by the straps or loops by passing a portion of the first strap or loop of the garment through the gap 237 onto the base of the L-shaped hook 234 and similarly passing a portion of the second strap or loop onto the base of the further L-shaped hook 224.

Referring to FIGS. 15 to 19 a garment hanger 30 forming a still further embodiment of the invention is similar to the second described embodiment 20. As best seen in FIGS. 17 and 19, the garment hanger 30 has an arm 33 having a longitudinal axis and an upper face 335. Dependent from the upper face 335 of the arm 33, proximate an outer, free end thereof, there is provided an L-shaped hook 334 similar to the L-shaped hook 234 of the previously described embodiment. However, in the garment hanger 30 the arm 33 is provided, inward of, and spaced from, the inward extending L-shaped hook 334, with a second, outward extending, L-shaped hook 3341 being a mirror image of the L-shaped hook 334. An elongate portion of the upper face 335 of the arm 33 substantially above, in use, the bases of the hooks 334 and 3341 is cut away to form an elongate cutaway 336. The elongate cutaway 336 extends further than a combined length of the bases of the L-shaped hooks 334 and 3341 to define a gap 337 between opposed free extremities of the bases of the L-shaped hooks 334 and 3341.

The garment hanger is provided with a further arm 32 opposed to the arm 33 having a further pair of opposed L-shaped hooks 324 and 3241 so that the further arm 32 and the further L-shaped hooks 324 and 3241 are a mirror image of the arm 33 and the pair of opposed L-shaped hooks 334 and 3341.

In use, a garment having, for example, first and second straps or loops may be suspended from the garment hanger by the straps or loops, by passing a portion of the first strap or loop of the garment through the gap 337 onto the base of at least one of the L-shaped hooks 334 and 3341 and similarly passing a portion of the second strap or loop onto at least one of the bases of the further L-shaped hooks 324 and 3241. It will be understood that, especially where a strap or loop is wider than the gap 337, the outward extending hook 3341 tends to prevent the strap or loop from inadvertently slipping off the base of the L-shaped hook 334.

Although the second, outward extending L-shaped hooks 3341, 3241 have been described as mirror images respectively of their paired respective inward extending L-shaped hooks 334 and 324, it will be understood that alternatively the dimensions of the outward extending L-shaped hooks 3341, 3241 could be different from the dimensions of the inward extending L-shaped hooks 334, 324. In particular, the bases of the outward extending L-shaped hooks could be of a different length from a length of the bases of the inward extending L-shaped hooks and, as long as the gap between the free extremities of the opposed inward and outward extending L-shaped hooks is smaller than a width of a strap or loop by which a garment is to be suspended, the outward extending L-shaped hook will tend to prevent the strap or loop from inadvertently slipping off the bases of the L-shaped hooks.

Although the garment hangers 20 and 30 have been described with L-shaped hooks having linear base portions it will be understood that other shapes of hook, for example, upwardly concave hooks, could alternatively be provided.

It will be understood that the garment hangers 20 and 30 described and illustrated have an advantage over many garment hangers of the prior art in that the hooks are obscured from the front of the garment hangers by the front faces thereof, in an advantageous manner for display. However, it will be understood that the invention is not so limited and the hooks could alternatively extend sufficiently from the upper face as to be partially visible from a front of the garment hanger.

As shown in FIG. 6, a split line 61, 62, with a cavity 64 of a mold used to mold the garment hanger above the split line, and a core 65 of the mold below the split line 61, 62, is located at a base of a front face of the garment hanger forming the first leg 127 of the inverted J-section cross-section and at the base of the rear return portion 126 on the rear of the garment hanger. That is, the garment hanger defines a major plane substantially perpendicular to a surface defined by the split line. It will be understood that in garment hangers 20 and 30 the split line would essentially remain the same but would follow the shape of the hooks.

Figure 8:
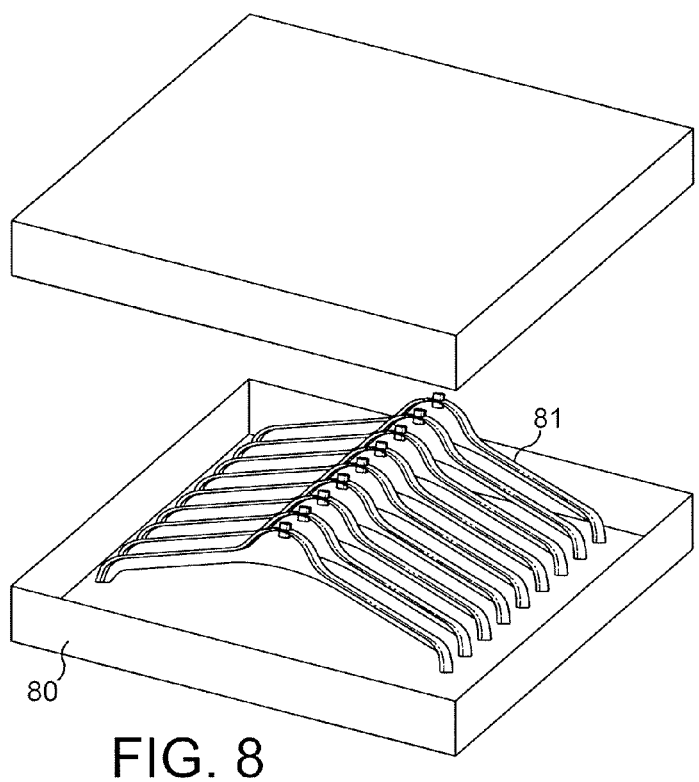
FIG. 8 is a schematic perspective drawing of a molding tool containing known U-section garment hangers or garment hangers according to the invention.

The garment hangers are conveniently molded upright in a tool as shown in FIG. 8. Because a major portion of the core 65 is wider than a distance between the first leg 127 and the second leg 126, the core is stronger than a core used for a U-section garment hanger. It is therefore possible to locate cooling channels in a majority of the core close to the cavity, resulting in faster cooling and therefore shorter molding cycle times, reducing costs of production. That is, a portion of the core which is between the front leg 115, 127 and the rear leg 116, 126 of the garment hanger does not contain cooling channels but a remaining portion of the core block 65 carries cooling channels, so that effective cooling is achieved because the "short" portion of the core 65 between the front and rear legs is thermally attached to a well-cooled main body of the core tool.

Because the inverted J-section cross-section of the garment hanger is open on one side, and does not have a large surface to shrink on to the core 65, ejection of the molded garment hanger 10 does not require as many ejector pins to eject the garment hanger from the mold as a U-section garment hanger requires, so that the tooling costs are also less than for a U-section garment hanger.

Figure 9:
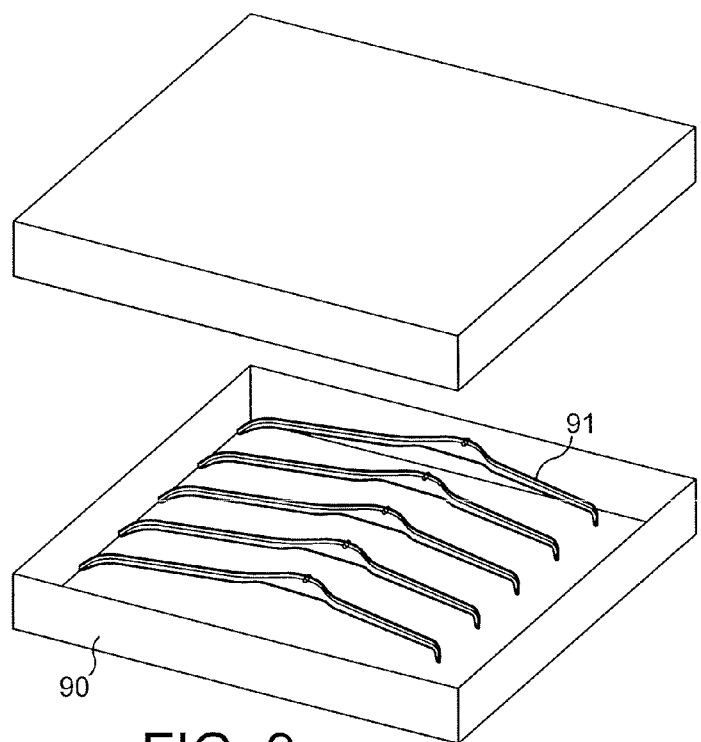
FIG. 9 is a schematic perspective drawing of a molding tool containing known I-section or known C-section garment hangers.
Figure 10:
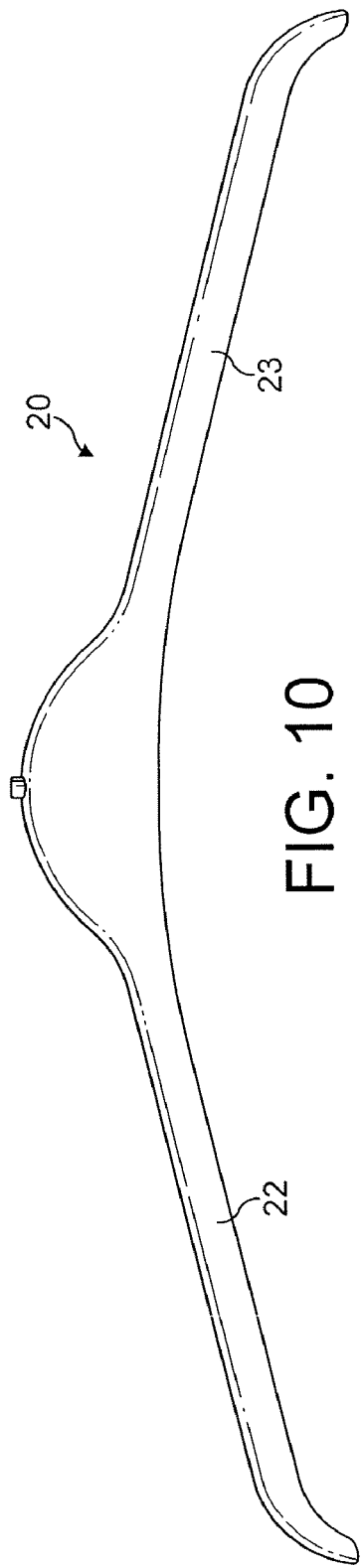
FIG. 10 is a front view of a second embodiment of a garment hanger according to the invention.
Figure 11:
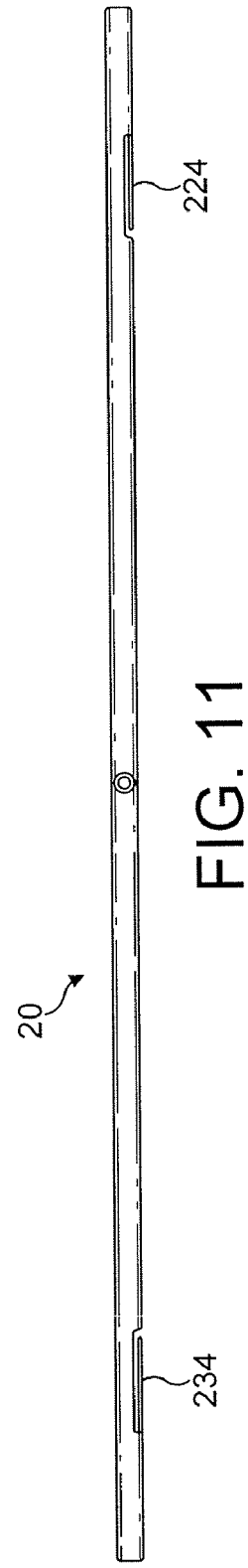
FIG. 11 is a top view of the garment hanger of FIG. 10.
Figure 15:
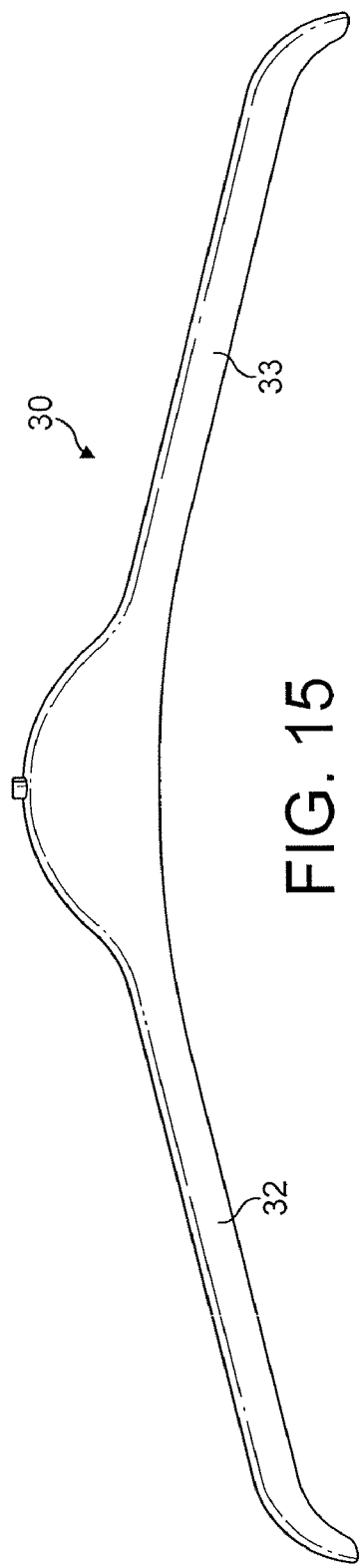
FIG. 15 is a front view of a third embodiment of a garment hanger according to the invention.
Figure 16:
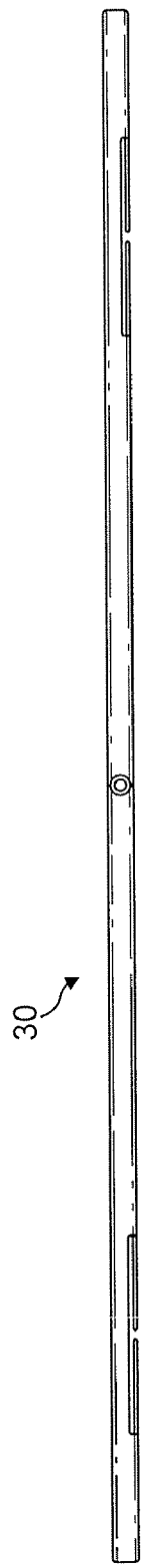
FIG. 16 is a top view of the garment hanger of FIG. 15.

As can be seen from FIGS. 8 and 9, because of the closer packing, a larger number of U-section or J-section garment hangers can be molded simultaneously in a given size molding tool than I-section or C-section garment hangers can be molded simultaneously in a same size molding tool, further reducing costs of production for U-section or J-section garment hangers compared with I-section or C-section garment hangers.

The J-section garment hanger of the invention has the additional advantage of a solid appearance, similar to that of a U-section garment hanger, in which no flanges are visible, while being more economical to produce than a solid garment hanger or a U-section garment hanger. It will be understood that in use a garment is in contact with the upper and front faces of the garment hanger Although the present invention has been described with reference to preferred embodiments, workers skilled in the art will recognize that changes may be made in form and detail without departing from the spirit and scope of the invention.

I claim:

1. An injection molding apparatus for molding a garment hanger, the apparatus comprising a cavity and core co-operatively defining a void of inverted J-shape transverse cross-section for molding a garment hanger, defining a major plane of the garment hanger, such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line defines at least one surface substantially perpendicular to the major plane of the garment hanger.

2. An injection molding apparatus as claimed in claim 1, wherein the molding split line is located on the front face of the first leg and on a rear face of the second leg.

3. An injection molding apparatus as claimed in claim 1, wherein the molding split line is located at a base of the front face of the first leg.

4. An injection molding apparatus as claimed in claim 1, wherein the molding split line is located at a base of the rear face of the second leg.

5. An injection molding apparatus as claimed in claim 1, wherein a major portion of the core is of a sufficient thickness for cooling channels to be located in the major portion of the core proximate the cavity.

6. An injection molding apparatus as claimed in claim 1, wherein a major portion of the core is wider than a distance between the first leg and the second leg.

7. An injection molding apparatus as claimed in claim 5, wherein cooling channels are located in the core proximate the cavity.

8. An injection molding apparatus for molding a garment hanger, the apparatus comprising a cavity and core co-operatively defining a void of inverted J-shape transverse cross-section for molding a garment hanger, defining a major plane of the garment hanger, such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line defines at least one surface substantially perpendicular to the major plane of the garment hanger, wherein the molding split line located on the front face of the first leg and on a rear face of the second leg.

9. An injection molding apparatus for molding a garment hanger, the apparatus comprising a cavity and core co-operatively defining a void of inverted J-shape transverse cross-section for molding a garment hanger, defining a major plane of the garment hanger, such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line defines at least one surface substantially perpendicular to the major plane of the garment hanger, wherein the molding split line is located at a base of the front face of the first leg.

10. An injection molding apparatus for molding a garment hanger, the apparatus comprising a cavity and core co-operatively defining a void of inverted J-shape transverse cross-section for molding garment hanger, defining a major plane of the garment hanger, such that a first leg of the J-shape cross-section forms a front of the garment hanger, a base of the J-shape cross-section forms a transversely arcuate upper face of the garment hanger for receiving shoulders of a garment to be suspended from the garment hanger and a second leg, opposed to the first leg, and substantially shorter than the first leg, forms a return rear portion of the garment hanger and wherein a molding split line defines at least one surface substantially perpendicular to the major plane of the garment hanger, wherein the molding split line is located at the base of the rear face of the second leg.

* * * * *